(12) United States Patent
Chang et al.

(10) Patent No.: US 12,214,436 B2
(45) Date of Patent: Feb. 4, 2025

(54) LASER SOLDERING SYSTEM AND LIGHT SHAPING METHOD THEREOF

(71) Applicant: DELTA ELECTRONICS, INC., Taoyuan (TW)

(72) Inventors: Yu-Chen Chang, Taoyuan (TW); Chun-Fei Kung, Taoyuan (TW); Shih-Yung Chiu, Taoyuan (TW); Shu-Han Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 644 days.

(21) Appl. No.: 17/643,189

(22) Filed: Dec. 8, 2021

(65) Prior Publication Data

US 2023/0023814 A1    Jan. 26, 2023

(30) Foreign Application Priority Data

Jul. 22, 2021 (CN) .......................... 202110831985.2

(51) Int. Cl.
*B23K 3/04* (2006.01)
*B23K 1/005* (2006.01)
(Continued)

(52) U.S. Cl.
CPC ............. *B23K 1/0056* (2013.01); *B23K 3/04* (2013.01); *B23K 26/048* (2013.01);
(Continued)

(58) Field of Classification Search
CPC .. B23K 26/035; B23K 26/064; B23K 26/082; B23K 26/062; B23K 26/384;
(Continued)

(56) References Cited

U.S. PATENT DOCUMENTS 9,616,522 B2 * 4/2017 Heinemann ........ B23K 26/0613
2005/0107773 A1 * 5/2005 Bergt .................. A61F 9/00827
606/4

(Continued)

FOREIGN PATENT DOCUMENTS

CN         103192149 A    7/2013
JP         2008260035 A   10/2008
(Continued)

*Primary Examiner* — Eric S Stapleton
(74) *Attorney, Agent, or Firm* — CKC & Partners Co., LLC

(57) ABSTRACT

A laser soldering system includes a laser source module, a polarization adjusting assembly, a temperature sensor, and a controller. The laser source module is configured to emit a laser beam. The polarization adjusting assembly includes a plurality of polarization elements and at least one stepping motor. The polarization elements are configured to split the laser beam into a Gaussian beam and a ring-shaped beam. The Gaussian beam illuminates the first element, and the ring-shaped beam is illuminates the second element. The stepping motor is configured to adjust a size of the ring-shaped beam. The temperature sensor is configured to monitor temperatures of the first element and a temperature of the second element. The controller is electrically connected to the temperature sensor, the laser source module, and the polarization adjusting assembly.

16 Claims, 8 Drawing Sheets

(51) Int. Cl.
- *B23K 26/03* (2006.01)
- *B23K 26/04* (2014.01)
- *B23K 26/06* (2014.01)
- *B23K 26/067* (2006.01)
- *B23K 26/073* (2006.01)
- *B23K 26/34* (2014.01)
- *G02B 5/00* (2006.01)
- *G02B 27/09* (2006.01)
- *G02B 27/28* (2006.01)

(52) U.S. Cl.
CPC ...... *B23K 26/0626* (2013.01); *B23K 26/0648* (2013.01); *B23K 26/0676* (2013.01); *B23K 26/0734* (2013.01); *B23K 26/34* (2013.01); *G02B 5/001* (2013.01); *G02B 27/0916* (2013.01); *G02B 27/283* (2013.01); *G02B 27/286* (2013.01)

(58) Field of Classification Search
CPC ............... B23K 26/21; B23K 26/0626; B23K 26/0676; B23K 1/0056; B23K 26/048; B23K 26/0648; B23K 26/0604; B23K 26/20; B23K 26/034; B23K 3/04; B23K 26/0734; G02B 26/0875; G02B 27/095; G02B 27/0927; G02B 6/3528; G02B 6/4206; G02B 27/0916; G02B 27/281; G02B 27/0938; G02B 27/283; G02B 27/286; G02B 5/001; H01S 3/0071

USPC .................................................. 219/121.67

See application file for complete search history.

(56) References Cited

U.S. PATENT DOCUMENTS

| | | | |
|---|---|---|---|
| 2012/0314286 A1* | 12/2012 | Chuang | G02B 5/0816 |
| | | | 359/489.08 |
| 2017/0361405 A1* | 12/2017 | Renz | B23K 26/705 |
| 2018/0062342 A1* | 3/2018 | Comstock, II | B23K 26/0624 |
| 2018/0093914 A1* | 4/2018 | Akarapu | B23K 26/0608 |
| 2019/0001442 A1* | 1/2019 | Unrath | B23K 26/0622 |
| 2019/0129093 A1* | 5/2019 | Li | H01S 5/02251 |

FOREIGN PATENT DOCUMENTS

| | | |
|---|---|---|
| JP | 5148118 B2 | 2/2013 |
| TW | I551954 B | 10/2016 |
| TW | 202009082 A | 3/2020 |

\* cited by examiner

LASER SOLDERING SYSTEM AND LIGHT SHAPING METHOD THEREOF

CROSS-REFERENCE TO RELATED APPLICATION

This application claims priority to China Application Serial Number 202110831985.2, filed on Jul. 22, 2021, which is herein incorporated by reference in its entirety.

BACKGROUND

Field of Invention

The present invention relates to a laser soldering system and a light shaping method of the laser soldering system.

Description of Related Art

Laser soldering is a high precision method in soldering technique field. However, the high voltage Gaussian beam may cause damage due to overheating to the elements below the gap between the pin and the soldering pad.

In addition, the temperatures of the pin and the soldering elements are close but different during temperature controlled processing. If the power ratio between the laser beams illuminate the pin and the soldering pad are inappropriate, rough solder melting due to insufficient heating of the soldering pad or damage of the pin due to overheating may occur.

Accordingly, it is still a development direction for the industry to provide a laser soldering system and a light shaping, a.k.a. "beam shaping" method of the laser soldering system that can shape laser light, a.k.a. laser beam, based on different regions of the heated elements and monitor laser power ratio in real-time to avoid aforementioned problems.

SUMMARY

The invention provides a laser soldering system applying for processing a first element and a second element with different processing temperatures, and the first element is adjacent to the second element.

In some embodiments, the laser soldering system includes a laser source module, a polarization adjusting assembly, a temperature sensor, and a controller. The laser source module is configured to emit a laser beam. The polarization adjusting assembly includes a plurality of polarization elements and at least one stepping motor. The polarization elements are configured to split the laser beam into a Gaussian beam and a ring-shaped beam. The Gaussian beam illuminates the first element, and the ring-shaped beam is illuminates the second element. The stepping motor is configured to adjust a size of the ring-shaped beam. The temperature sensor is configured to monitor temperatures of the first element and a temperature of the second element. The controller is electrically connected to the temperature sensor, the laser source module, and the polarization adjusting assembly.

In some embodiments, the polarization elements further includes a first polarization beam splitter and a second polarization beam splitter. The first polarization beam splitter is configured to split the laser beam into a first arm and a second arm. The second polarization beam splitter is configured to combine the first arm and the second arm, and the second arm is the Gaussian beam.

In some embodiments, the polarization elements further includes an axicon lens assembly located along the first arm, the axicon lens assembly is located between the first polarization beam splitter and the second polarization beam splitter, and the axicon lens assembly is configured to form the ring-shaped beam.

In some embodiments, the axicon lens assembly further includes two axicon lenses respectively having a flat top surface, and the stepping motor is configured to adjust a distance between the two axicon lenses.

In some embodiments, the polarization elements further includes at least one wave plate located between the first polarization beam splitter and the second polarization beam splitter, and the wave plate is configured to adjust a power of at least one of the first arm and the second arm.

In some embodiments, the first element is a pin, and the second element is a solder pad.

Another aspect of the present disclosure is a beam shaping method of the laser soldering system.

In some embodiments, the beam shaping method of a laser soldering system includes emitting a laser beam by a laser source module; performing a laser calibration step, and performing a laser processing step. The laser calibration step includes splitting the laser beam into a Gaussian beam and a ring-shaped beam by a polarization adjusting assembly; adjusting sizes of the Gaussian beam and the ring-shaped by the polarization adjusting assembly; and judging a power ratio between the Gaussian beam and the ring-shaped. The Gaussian beam illuminates the first element, and the ring-shaped beam illuminates the second element. The first element is adjacent to the second element. The laser processing step includes monitoring a temperature of the first element and a temperature of the second element by a temperature sensor; and adjusting a power of the Gaussian beam and a power of the ring-shaped beam based on a monitoring result from the temperature sensor.

In some embodiments, splitting the laser beam into the Gaussian beam and the ring-shaped beam by the polarization adjusting assembly further includes splitting the laser beam into a first arm and a second arm by a first polarization beam splitter.

In some embodiments, splitting the laser beam into the Gaussian beam and the ring-shaped beam by the polarization adjusting assembly further includes combining the first arm and the second arm by a second polarization beam splitter, wherein the second arm is the Gaussian beam.

In some embodiments, splitting the laser beam into the Gaussian beam and the ring-shaped beam by the polarization adjusting assembly further includes forming the ring-shaped beam from the first arm passed the first polarization beam splitter by an axicon lens assembly.

In some embodiments, the axicon lens assembly includes two axicon lenses each having a flat top surface, and adjusting the size of the ring-shaped further includes adjusting a distance between the two axicon lenses by a stepping motor.

In some embodiments, judging the power ratio between the Gaussian beam and the ring-shaped further includes adjusting a power of at least one of the first arm and the second arm by at least one wave plate.

In some embodiments, adjusting the size of the Gaussian beam further includes adjusting a working distance between the combined laser beam to the first element and the second element so as to adjust the size of the Gaussian beam.

In some embodiments, judging the power ratio between the Gaussian beam and the ring-shaped beam further includes reducing a difference between a temperature rising curve of the first element and a temperature rising curve of the second element.

In some embodiments, adjusting the power of the Gaussian beam and the power of the ring-shaped beam based on the monitoring result from the temperature sensor further includes adjusting a laser beam output intensity of the laser source module.

In some embodiments, the first element is a pin, and the second element is a soldering pad.

In the aforementioned embodiments, the laser soldering system and the beam shaping method of the present disclosure can shape the laser beam by using the polarization adjusting assembly so as to adjust sizes of the Gaussian beam and the ring-shaped beam. As such, soldering processing efficiency can be improved so as to avoid unnecessary energy consumption. Furthermore, the polarization adjusting assembly and the laser source module can be controlled by the monitoring result of the temperature sensor such that the temperatures of the first element and the second element can be remained in a safe range. As a result, the soldering processing yield can be improved.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
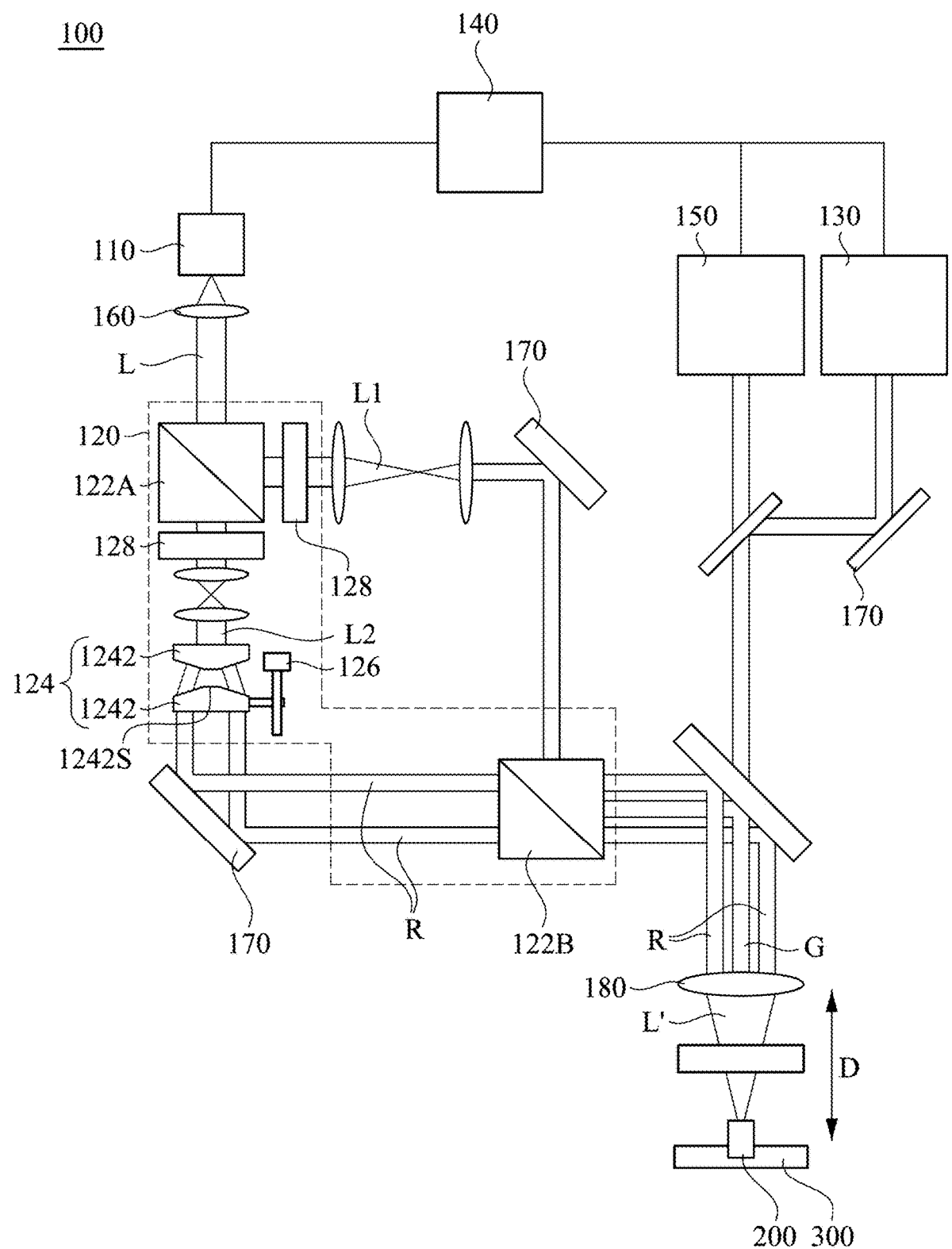
FIG. 1 is a schematic of a laser soldering system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic of a laser soldering system 100 according to one embodiment of the present disclosure. The laser soldering system 100 is applied for processing a first element 200 and a second element 300. The laser soldering system 100 includes a laser source module 110, a polarization adjusting assembly 120, a temperature sensor 130, and a controller 140. The laser source module 110 is configured to emit a laser beam L. The polarization adjusting assembly 120 includes multiple polarization elements and at least one stepping motor 126. The polarization elements are configured to split the laser beam L into a first arm L1 and a second arm L2. Subsequently, the first arm L1 and the second arm L2 are shaped respectively and are combined to form a shaped laser beam L'.

The polarization adjusting assembly 120 includes a first polarization beam splitter 122A, a second polarization beam splitter 122B, an axicon lens assembly 124, and two wave plates 128. The first polarization beam splitter 122A is configured to split the laser beam L into a first arm L1 and a second arm L2 based on different polarization states. The first arm L1 is a Gaussian beam G. The axicon lens assembly 124 is located along the first arm L1, and the axicon lens assembly 124 is located between the first polarization beam splitter 122A and the second polarization beam splitter 122B. The axicon lens assembly 124 is configured to form a ring-shaped beam R. The second polarization beam splitter 122B is configured to combine the Gaussian beam G and the ring-shaped beam R to form a laser beam L'.

The axicon lens assembly 124 includes two axicon lenses 1242, and the two axicon lenses 1242 respectively has a flat top surface 1242S. The two axicon lenses 1242 faces each other, and the stepping motor 126 is configured to adjust a distance between the two axicon lenses 1242 so as to adjust the shape of the ring-shaped beam R.

The wave plates 128 are located between the first polarization beam splitter 122A and the second polarization beam splitter 122B, and are configured to adjust the rotation angle of the polarization states. The wave plates 128 are configured to adjust a power of at least one of the first arm L1 and the second arm L2. Specifically, the wave plates 128 are ¼ wavelength wave plates, the laser along the first arm pass through the wave plates 128 and the second polarization beam splitter 122B sequentially, and there is a portion of the laser with certain polarization state. Therefore, the energy of the Gaussian G of the combined laser beam L' can be adjusted by depositing the wave plates 128 between the first polarization beam splitter 122A and the second polarization beam splitter 122B.

In the present embodiment, the two wave plates 128 are located along the first arm L1 and the second arm L2 respectively, and the wave plates 128 are located at two opposite sides of the first polarization beam splitter 122A. In some other embodiments, the laser soldering system may have only one wave plate located along one of the first arm L1 and the second arm L2.

Figure 2:
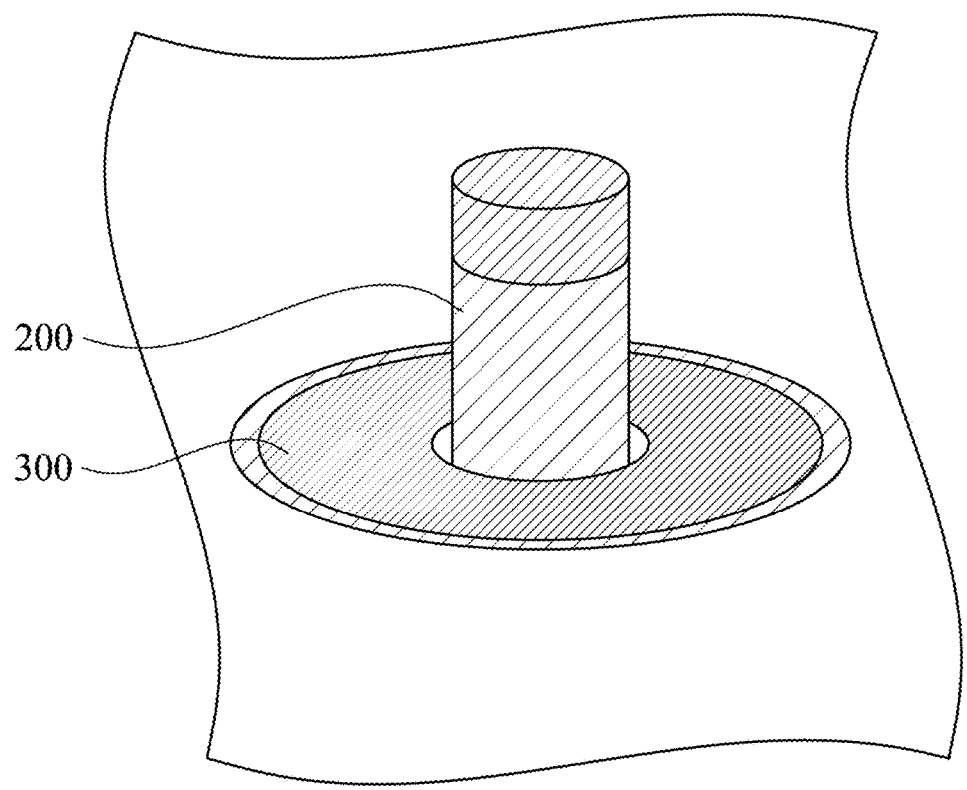
FIG. 2 is a schematic of a first element and a second element according to one embodiment of the present disclosure.
Figure 3:
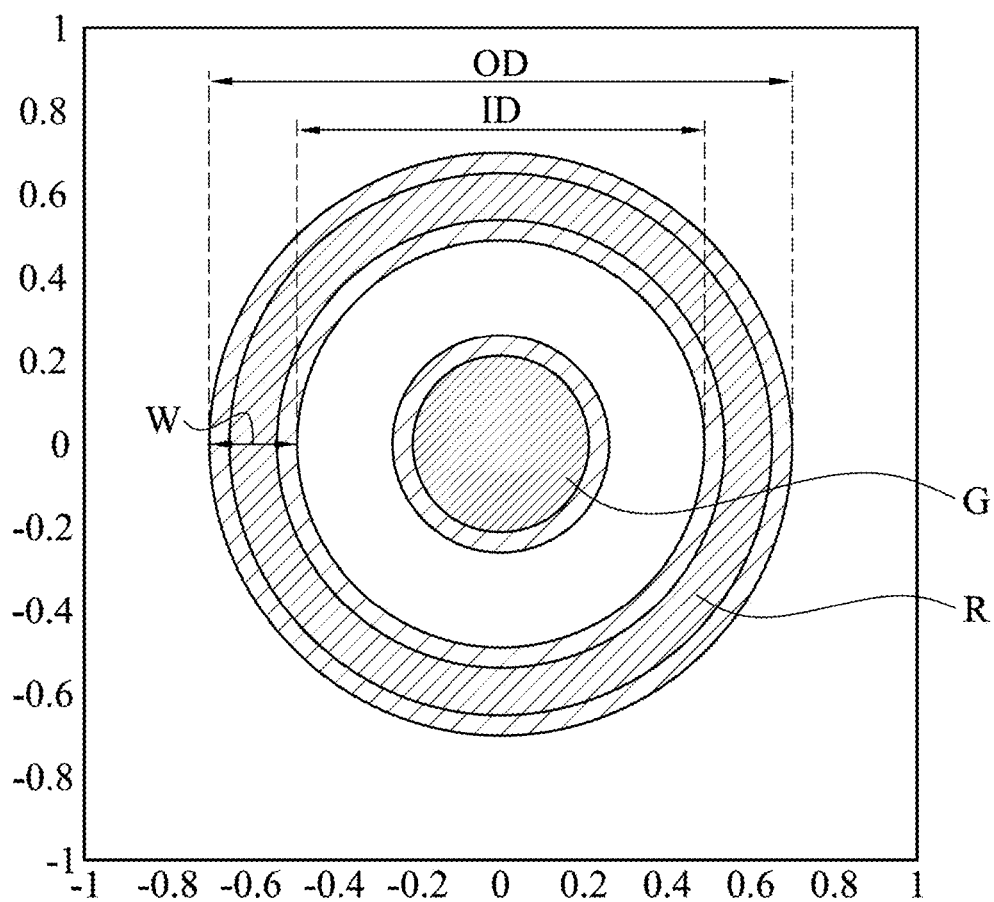
FIG. 3 is a temperature schematic of a Gaussian beam and a ring-shaped beam.

FIG. 2 is a schematic of a first element 200 and a second element 300 according to one embodiment of the present disclosure. FIG. 3 is a temperature schematic of a Gaussian beam G and a ring-shaped beam R. In the present embodiment, the first element 200 is a pin, and the second element is a soldering pad, but the present disclosure is not limited in these regards. The Gaussian beam G illuminates on the first element 200, and the ring-shaped beam R illuminates on the second element 300. As shown in FIG. 1 and FIG. 3, the temperature sensor 130 is configured to monitor temperatures of the first element 200 and a temperature of the second element 300, and the temperatures of the first element 200 and a temperature of the second element 300 are controlled through adjustment of the power ratio of the Gaussian beam G and the ring-shaped beam R by using the wave plates 128.

The controller 140 is electrically connected to the temperature sensor 130, the laser source module 110, and the polarization adjusting assembly 120. Suitable wave plate 128 can be deposited and the laser beam output intensity of the laser source module 110 can be controlled based on a monitoring result from the temperature sensor through the controller 140.

The laser soldering system 100 further includes an optical sensor 150 configured to monitor the first element 200, the second element 300, the Gaussian beam G, and the ring-shaped beam R. Alignment between the Gaussian beam G and the first element 200 and between the ring-shaped beam R and the second element 300 can be judged through the monitoring result of the optical sensor 150. The controller 140 can control the movement of the stepping motor 126 and adjust the working distance D from the laser beam L' to the first element 200 and the second element 300 based on the monitoring result of the optical sensor 150. As shown in FIG. 3, the inner diameter ID and the ring width W (the difference between the inner diameter ID and the outer diameter OD) can be further adjusted by adjusting the distance between the two axicon lenses 1242 through the stepping motor 126. As such, the illuminating range of the ring-shaped beam R can match the range of the second element 300 that is required to be illuminated. The working distance D from the laser beam L' to the first element 200 and the second element 300 can be controlled through the focusing lens 180. As such, the illuminating range of the Gaussian beam G can match the range of the first element 200 that is required to be illuminated. With such design, overheating and damage of the element below the gap between the pin and the soldering pad can be prevented, and thereby increase the yield.

The laser soldering system 100 further includes a collimating lens 160 located between the laser source module 110 and the polarization adjusting assembly 120. The collimating lens 160 can make the laser beam L from the laser source module 110 enters the first polarization beam splitter 122A. The laser soldering system 100 further includes reflective lenses 170 respectively located along the first arm L1 and the second arm L2. The reflective lenses 170 can reflect the laser from the first arm L1 and the second arm L2 to the second polarization beam splitter 1226 respectively.

Figure 4:
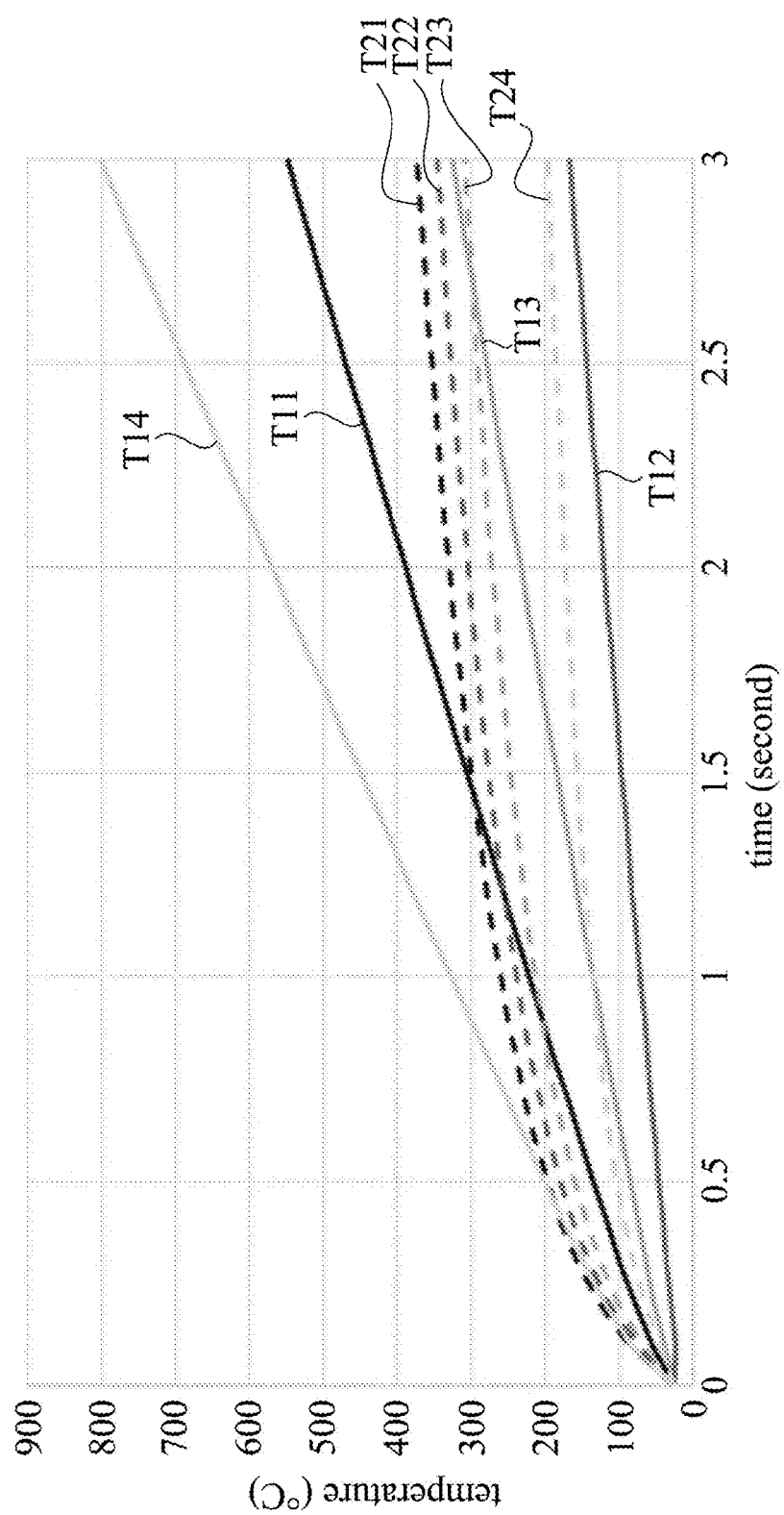
FIG. 4 is temperature rising curves of the first element and the second element according to one embodiment of the present disclosure.

FIG. 4 is temperature rising curves of the first element 200 and the second element 300 according to one embodiment of the present disclosure. The temperature rising curves T11~T14 are the temperature rising curves of the first element 200 under laser beams with different power ratio. The temperature rising curves T21~T24 are the temperature rising curves of the second 300 under laser beams with different power ratio. The temperature rising curves T11,T21 demonstrate the temperature rising conditions with a single laser beam illumination. According to the temperature rising curves T11,T21, when the power ratio is set as default, the temperature of the first element 200 is 200 degrees higher than the second element 300 after illuminating time of 3 seconds.

Figure 5A:
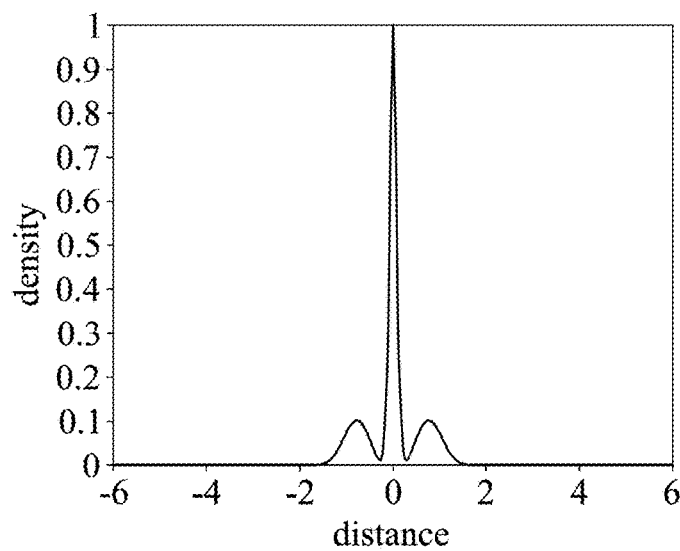
FIG. 5A to FIG. 5C are simulation figures of power ratio between a Gaussian beam and a ring-shaped beam according to various embodiments of the present disclosure.
Figure 5B:
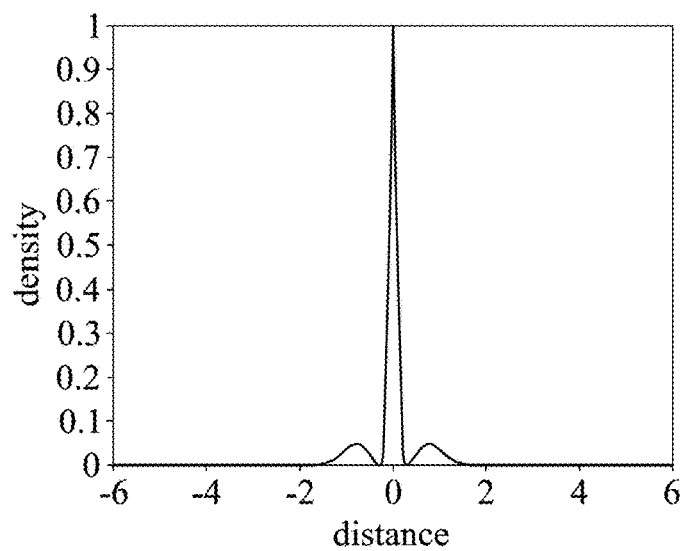
Figure 5C:
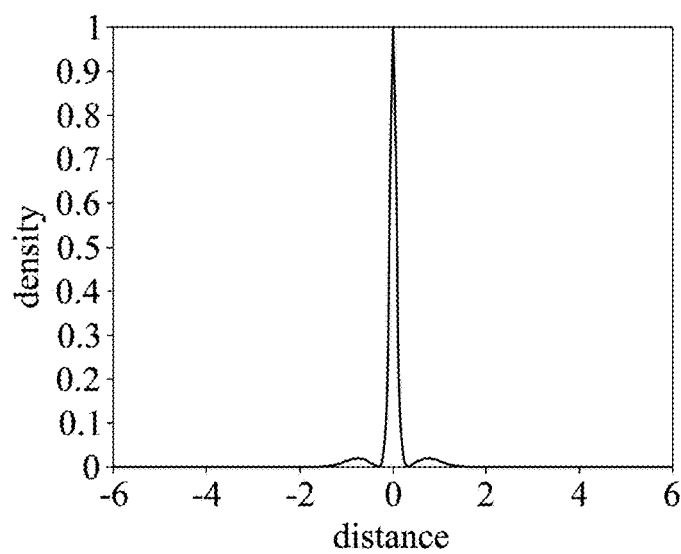

FIG. 5A to FIG. 5C are simulation figures of power ratio between a Gaussian beam G and a ring-shaped beam R according to various embodiments of the present disclosure. Reference is made to FIG. 4 and FIG. 5A. The temperature rising curves T12,T22 demonstrate the temperature rising conditions with 10% Gaussian beam G and 90% ring-shaped beam R (ratio 1:9). FIG. 5A is the intensity distribution of the laser beam L' with ratio 1:9. Reference is made to FIG. 4 and FIG. 5B. The temperature rising curves T13,T23 demonstrate the temperature rising conditions with 20% Gaussian beam G and 80% ring-shaped beam R (ratio 2:8). FIG. 5B is the intensity distribution of the laser beam L' with ratio 2:8. Reference is made to FIG. 4 and FIG. 5C. The temperature rising curves T14,T24 demonstrate the temperature rising conditions with 30% Gaussian beam G and 70% ring-shaped beam R (ratio 3:7). FIG. 5C is the intensity distribution of the laser beam L' with ratio 3:7.

According to the temperature rising curves T13,T23 in the present embodiment, when the power ratio between the Gaussian beam G and the ring-shaped beam R is 2:8, the temperature difference between the first element 200 and the second element 300 can be reduced to about 25 degrees. Therefore, a suitable wave plate 128 can be deposited so as to adjust the power ratio between the Gaussian beam G and the ring-shaped beam R based on the power ratio derived from simulations and experiment data. Large temperature difference between the pin and the soldering pad that cause overheating or overcooling in one of the pin and the soldering pad can be prevented by selecting suitable power ratio.

Figure 6A:
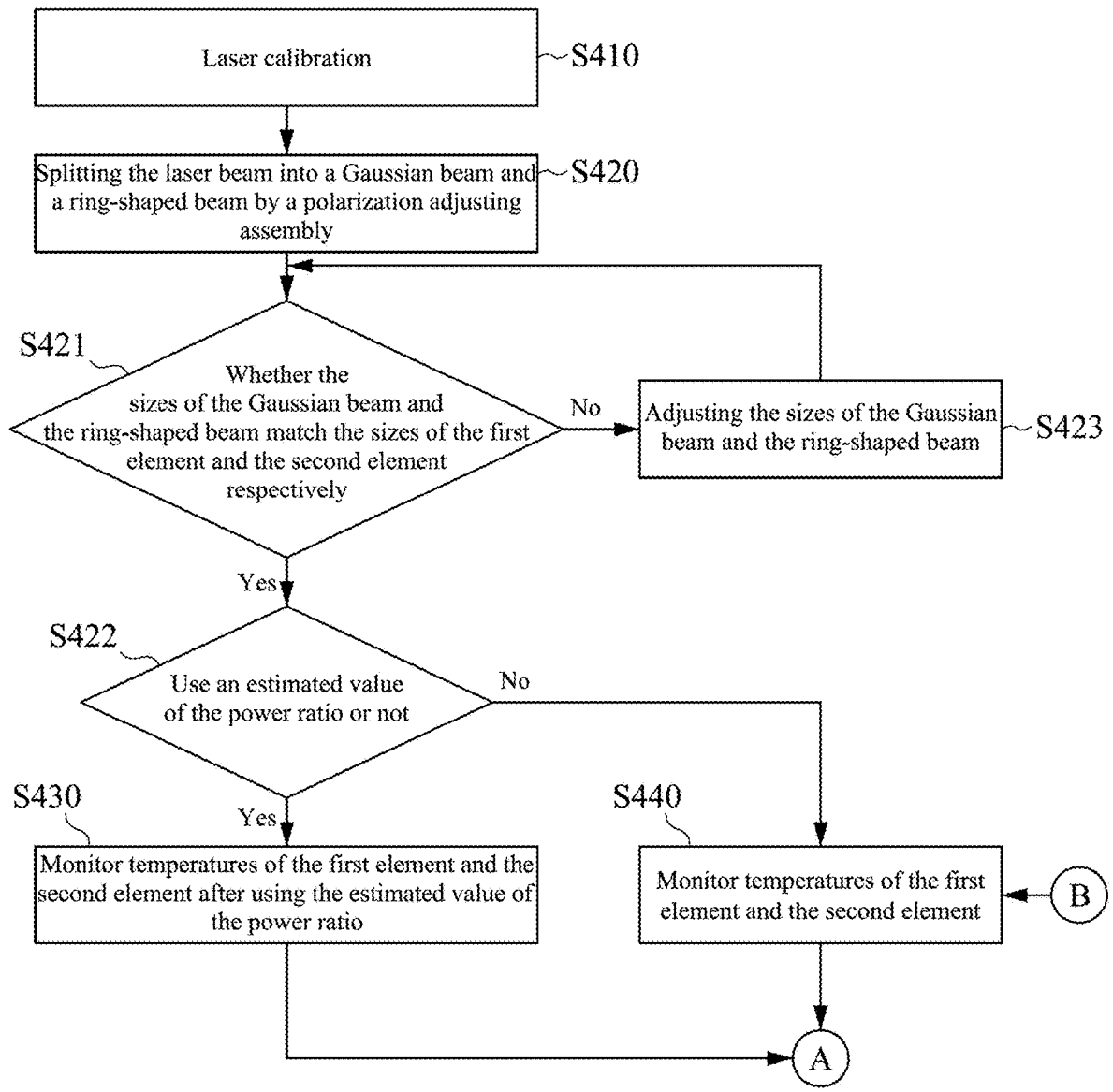
FIGS. 6A to 6C are flow charts of a beam shaping method of a laser soldering system according to one embodiment of the present disclosure.
Figure 6B:
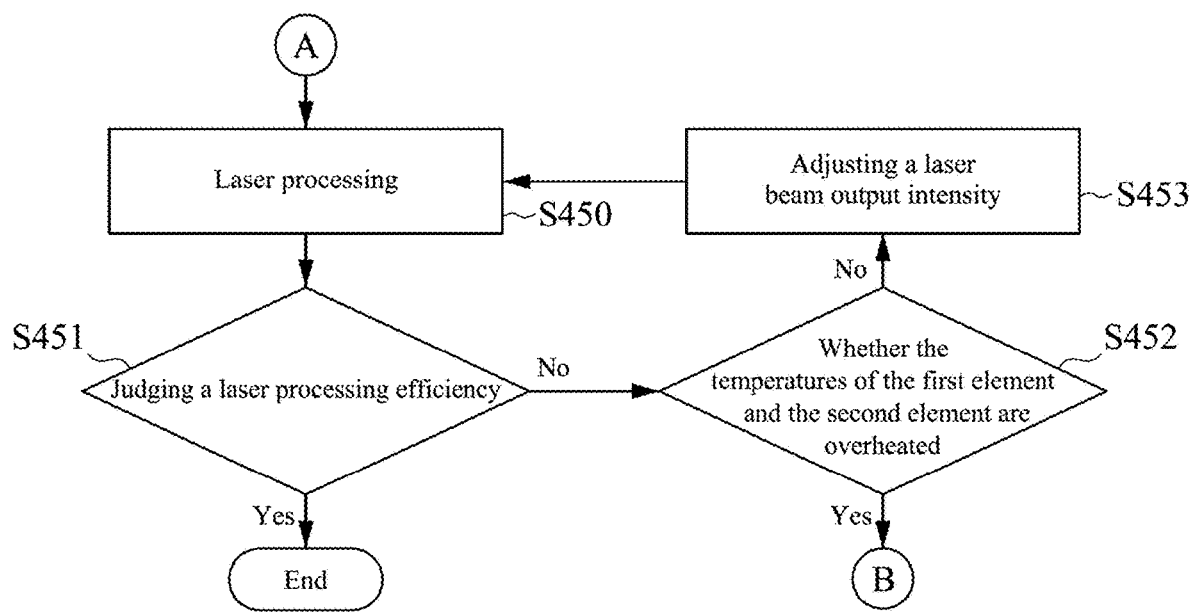
Figure 6C:
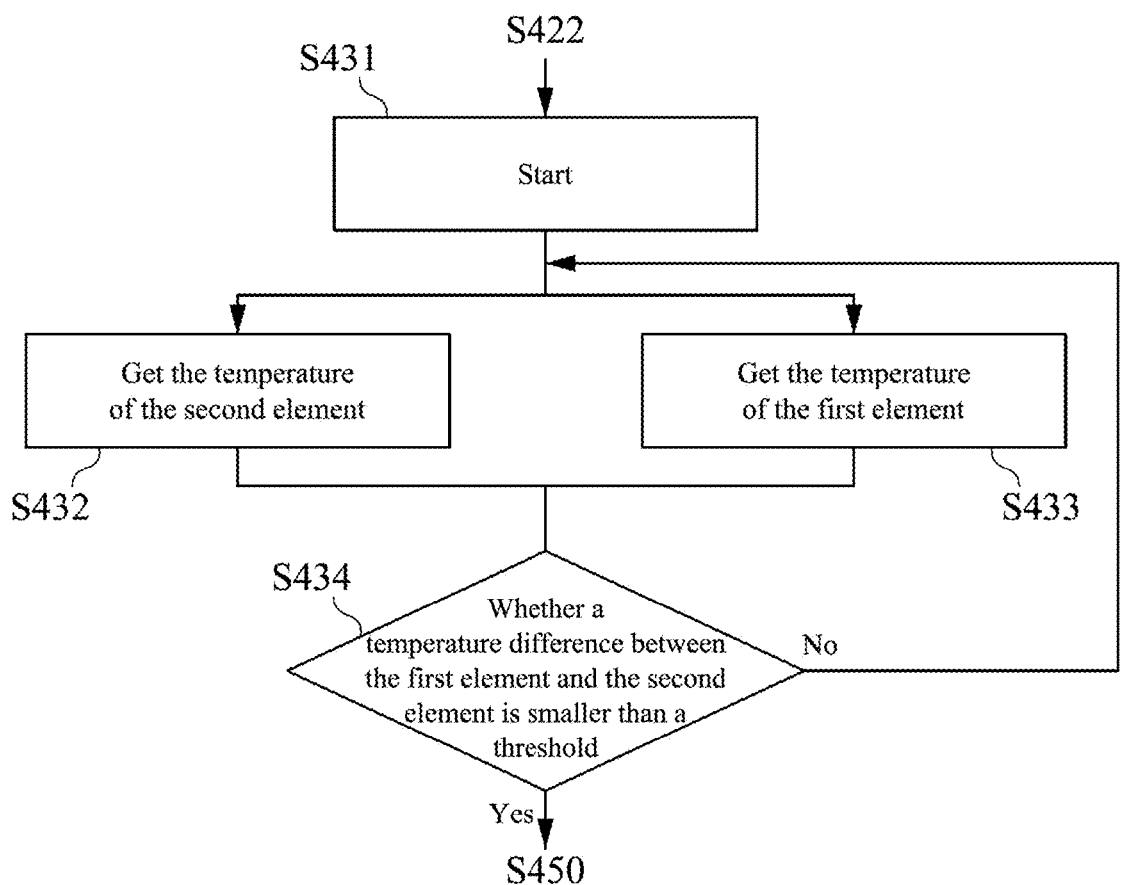

FIGS. 6A to 6C are flow charts of a beam shaping method of a laser soldering system according to one embodiment of the present disclosure. In the present embodiment, the laser soldering system 100 shown in FIG. 1 is used as an example. Reference is made to FIG. 1 and FIG. 6A, the beam shaping method of the laser soldering system 100 begins at step S410, a laser beam L is emitted from the laser source module 110, and laser calibration is performed. The detail steps of the laser calibration includes steps S420~S440.

In step S420, the laser beam L is split into the Gaussian beam G and the ring-shaped beam R by the polarization adjusting assembly 120. As described above, in this step, the first polarization beam splitter 122A of the polarization adjusting assembly 120 can split the laser beam L into the first arm L1 and the second arm L2 first. Subsequently, the ring-shaped beam R is formed from the first arm L1 passed the first polarization beam splitter 122A by the axicon lens assembly 124 of the polarization adjusting assembly 120. The shaped first arm L1 (that is the Gaussian beam G) and the second arm L2 (that is the ring-shaped beam R) are combined through the second polarization beam splitter 1226 of the polarization adjusting assembly 120.

In step S421, judge that whether the sizes of the Gaussian beam G and the ring-shaped beam R match the sizes of the first element 200 and the second element 300, respectively. In this step, the judgement is performed by the controller 140 based on the optical sensor 150. When the result of step S421 is yes, the method continues to step S422. When the result of step S421 is no, the method continues to step S423.

In step S422, judge whether to use an estimated value of the power ratio or not. For example, the power ratio can be derived from simulations and experiment data as described above according to FIG. 4 and FIGS. 5A to 5C, but the present disclosure is not limited in these regards.

If the result of step S422 is yes, the method continues to step S430, in which the temperatures of the first element 200 and the second element 300 are monitored after using the estimated value of the power ratio. If the result of step S422 is no, the method continues to step S440, in which the adjusted temperatures of the first element 200 and the second element 300 are monitored. Details of step S430 and step S440 will be described in paragraphs according to FIG. 6C.

In step S423, the inner diameter ID and the ring width W of the ring-shaped beam R can be adjusted by adjusting the distance between the two axicon lenses 1242. In addition, the illumination range of the Gaussian beam G can be adjusted by adjusting the working distance D. After the adjustment in step S423, the step S421 can be performed again.

Reference is made to FIG. 1 and FIG. 6B simultaneously, the laser processing step in step S450 is performed after finishing the laser calibration steps. In step S450, the Gaussian beam G illuminates on the first element 200, and the ring-shaped beam R illuminates on the second element 300. The detail steps of the laser processing includes steps S451~S453.

In step S451, judging whether a laser processing efficiency matches an expectation. For example, this step can be performed by judging whether the melting condition of the pin and the soldering pad and the soldering result match the expectation. If the result of step S451 is yes, laser processing steps can be finished. If the result of step S451 is no, step S452 is performed.

In step S452, temperatures of the first element 200 and the second element 300 can be monitored by the temperature sensor 130 so as to judge whether the first element 200 and the second element 300 are overheated. When the result of step S451 is yes, step S440 is performed again (see FIG. 6B). When the result of step S451 is no, step S453 is performed.

In step S453, the laser beam output intensity of the laser source module 110 is adjusted based on the monitoring result from the temperature sensor 130 so as to reduce the power ratio of the Gaussian beam G and the ring-shaped beam R.

Reference is made to FIG. 1 and FIG. 6C, step S430 includes steps S431~S434. In step S431, judge power ratio of the Gaussian beam G and the ring-shaped beam R respectively based on the estimated value of the power ratio. In step S432, get the temperature of the second element 200 through the temperature sensor 130. In step S433, get the temperature of the first element 200 through the temperature sensor 130. In step S434, judge that whether a temperature difference between the first element 200 and the second element 300 is smaller than a threshold. For example, the threshold value can be the temperature difference which is about 25 degrees shown by the temperature rising curves T13,T23 in FIG. 4, but the present disclosure is not limited in this regards. If the result of step S434 is yes, the method continues to the step S450 shown in FIG. 6B. If the result of step S434 is no, the power of at least one of the Gaussian beam G and the ring-shaped beam R can be adjusted through the wave plate 128. As such, a difference between the temperature rising curve of the first element and the temperature rising curve of the second element can be reduced (see FIG. 4). Step S432, S433 can be performed again so as to get adjusted temperatures of the first element 200 and the second element 300.

Step S440 is substantially the same as step S430, and the difference is that the power ratio used in step S440 is the power ratio after being subtly adjusted based on the monitoring result of the temperature sensor 130. The detail steps are not repeated hereinafter.

According, the beam shaping method of the present disclosure is a real-time feedback system that can avoid thermal damage by adjusting power ratio during laser processing in real time. Comparing to the conventional Gaussian beam, the beam shaping method of the present disclosure has higher flexibility that can improve processing effect. In addition, since the Gaussian beam and the ring-shaped beam can be respectively adjusted based on the illuminating ranges of the first element and the second element, damage due to overheating of the element below the gap between the pin and the soldering pad can be prevented so as to increase the yield. The laser soldering system can be applied for elements with different configurations and materials, and therefore it has higher adaptability.

In summary, the laser soldering system and the beam shaping method of the present disclosure can shape laser beam according to different regions of the heated elements and monitor the power ratio in real time. As such, rough solder melting due to insufficient heating of the soldering pad or damage of the pin due to overheating can be avoided by avoiding using inappropriate laser power ratio between the pin and the soldering pad. The laser soldering system and the beam shaping method of the present disclosure can shape the laser beam by using the polarization adjusting assembly so as to adjust sizes of the Gaussian beam and the ring-shaped beam. As such, soldering processing efficiency can be improved so as to avoid unnecessary energy consumption. Furthermore, the polarization adjusting assembly and the laser source module can be controlled by the monitoring result of the temperature sensor such that the temperatures of the first element and the second element can be controlled precisely during the processing and remained in a safe range. As a result, the soldering processing yield can be improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A laser soldering system, applying for processing a first element and a second element with different processing temperatures, wherein the first element is adjacent to the second element, and the laser soldering system comprises:
   a laser source module configured to emit a laser beam;
   a polarization adjusting assembly, comprising:
   a plurality of polarization elements configured to split the laser beam into a Gaussian beam and a ring-shaped beam, wherein the Gaussian beam illuminates the first element, and the ring-shaped beam is illuminates the second element; and
   at least one stepping motor configured to adjust a size of the ring-shaped beam;
   a temperature sensor configured to monitor a temperatures of the first element and a temperature of the second element; and
   a controller electrically connected to the temperature sensor, the laser source module, and the polarization adjusting assembly.

2. The laser soldering system of claim 1, wherein the polarization elements further comprises:
   a first polarization beam splitter configured to split the laser beam into a first arm and a second arm; and
   a second polarization beam splitter configured to combine the first arm and the second arm, and the second arm is the Gaussian beam.

3. The laser soldering system of claim 2, wherein the polarization elements further comprises:
   an axicon lens assembly located along the first arm, wherein the axicon lens assembly is located between the first polarization beam splitter and the second polarization beam splitter, and the axicon lens assembly is configured to form the ring-shaped beam.

4. The laser soldering system of claim 3, wherein the axicon lens assembly further comprises:
   two axicon lenses, respectively comprises a flat top surface, and the stepping motor is configured to adjust a distance between the two axicon lenses.

5. The laser soldering system of claim 2, wherein the polarization elements further comprises:
   at least one wave plate located between the first polarization beam splitter and the second polarization beam splitter, and the wave plate is configured to adjust a power of at least one of the first arm and the second arm.

6. The laser soldering system of claim 1, wherein the first element is a pin, and the second element is a solder pad.

7. A beam shaping method of a laser soldering system, comprising steps of:
   emitting a laser beam by a laser source module;
   performing a laser calibration step, comprising steps of:
   splitting the laser beam into a Gaussian beam and a ring-shaped beam by a polarization adjusting assembly;
   adjusting sizes of the Gaussian beam and the ring-shaped beam by the polarization adjusting assembly; and
   judging a power ratio between the Gaussian beam and the ring-shaped beam; and
   performing a laser processing step, wherein the Gaussian beam illuminates a first element, and the ring-shaped beam illuminates a second element, the first element is adjacent to the second element, and the laser processing step further comprises:
   monitoring a temperature of the first element and a temperature of the second element by a temperature sensor; and
   adjusting a power of the Gaussian beam and a power of the ring-shaped beam based on a monitoring result from the temperature sensor.

8. The beam shaping method of claim 7, wherein splitting the laser beam into the Gaussian beam and the ring-shaped beam by the polarization adjusting assembly further comprising a step of:
   splitting the laser beam into a first arm and a second arm by a first polarization beam splitter.

9. The beam shaping method of claim 8, wherein splitting the laser beam into the Gaussian beam and the ring-shaped beam by the polarization adjusting assembly further comprising a step of:
   combining the first arm and the second arm by a second polarization beam splitter, wherein the second arm is the Gaussian beam.

10. The beam shaping method of claim 8, wherein splitting the laser beam into the Gaussian beam and the ring-shaped beam by the polarization adjusting assembly further comprising a step of:
    forming the ring-shaped beam from the first arm passed the first polarization beam splitter by an axicon lens assembly.

11. The beam shaping method of claim 10, wherein the axicon lens assembly comprises two axicon lenses each having a flat top surface, and adjusting the size of the ring-shaped beam further comprises a step of:
    adjusting a distance between the two axicon lenses by a stepping motor.

12. The beam shaping method of claim 8, wherein judging the power ratio between the Gaussian beam and the ring-shaped beam further comprises a step of:
    adjusting a power of at least one of the first arm and the second arm by at least one wave plate.

13. The beam shaping method of claim 8, wherein adjusting the size of the Gaussian beam further comprises a step of:
    adjusting a working distance between the combined laser beam to the first element and the second element so as to adjust the size of the Gaussian beam.

14. The beam shaping method of claim 7, wherein judging the power ratio between the Gaussian beam and the ring-shaped beam further comprises a step of:
    reducing a difference between a temperature rising curve of the first element and a temperature rising curve of the second element.

15. The beam shaping method of claim 7, wherein adjusting the power of the Gaussian beam and the power of the ring-shaped beam based on the monitoring result from the temperature sensor further comprises a step of:
    adjusting a laser beam output intensity of the laser source module.

16. The beam shaping method of claim 7, wherein the first element is a pin, and the second element is a soldering pad.

* * * * *